(12) United States Patent
Kobayashi

(10) Patent No.: US 8,523,417 B2
(45) Date of Patent: Sep. 3, 2013

(54) VEHICULAR HEADLAMP

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 445 days.

(21) Appl. No.: 12/833,450

(22) Filed: Jul. 9, 2010

(65) Prior Publication Data

US 2011/0013412 A1   Jan. 20, 2011

(30) Foreign Application Priority Data

Jul. 14, 2009   (JP) .................................. 2009-165446

(51) Int. Cl.
 *B60Q 1/00*   (2006.01)
 *F21V 11/00*   (2006.01)
 *F21V 17/02*   (2006.01)

(52) U.S. Cl.
 USPC .......................................... 362/539; 362/512

(58) Field of Classification Search
 USPC ................................................. 362/512, 539
 See application file for complete search history.

(56) References Cited

U.S. PATENT DOCUMENTS

| | | | |
|---|---|---|---|
| 4,985,816 A | | 1/1991 | Seko et al. |
| 5,023,758 A | * | 6/1991 | Allen et al. .................... 362/514 |
| 5,161,875 A | * | 11/1992 | Sekiguchi et al. ............ 362/466 |
| 5,829,870 A | * | 11/1998 | Remillard et al. ............ 362/510 |
| 7,370,996 B2 | | 5/2008 | Ohshio |
| 7,537,365 B2 | * | 5/2009 | Bender et al. ................ 362/512 |
| 2003/0202357 A1 | * | 10/2003 | Strazzanti ..................... 362/509 |
| 2005/0063191 A1 | * | 3/2005 | Larsen .......................... 362/510 |
| 2008/0144329 A1 | * | 6/2008 | Okuda .......................... 362/539 |

FOREIGN PATENT DOCUMENTS

| | | |
|---|---|---|
| JP | 01-244934 A | 9/1989 |
| JP | 07-296605 A | 11/1995 |
| JP | 2007-080521 A | 3/2007 |

OTHER PUBLICATIONS

English Abstract for JP2007080521 published on Mar. 29, 2007, espacenet database, 1 page.
English Abstract for JP1244934 published on Sep. 29, 1989, espacenet database, 1 page.
English Abstract for JP7296605 published on Nov. 10, 1995, espacenet database, 1 page.

* cited by examiner

*Primary Examiner* — Anh Mai
*Assistant Examiner* — Michael Santonocito
(74) *Attorney, Agent, or Firm* — Osha Liang LLP

(57) ABSTRACT

A vehicular headlamp includes a projection lens, a light source, a reflector, and a liquid crystal shutter. The liquid crystal shutter includes a pair of transparent plates, a liquid crystal member, and a pair of polarization plates. The liquid crystal member is disposed only in a part of an area between the pair of transparent plates. The pair of polarization plates are disposed only in an area of the outer surface of the pair of transparent plates corresponding to an area in which the liquid crystal member is disposed. The area in which the liquid crystal member is disposed includes a first area for blocking a part of reflected light from the reflector such that light emitted from the projection lens forms a low-beam distribution pattern having a cut-off line at an upper end edge, and a second area for blocking light emitted from the projection lens and then reflected by a road surface ahead of a vehicle toward a space above the cut-off line.

12 Claims, 5 Drawing Sheets

VEHICULAR HEADLAMP

BACKGROUND OF INVENTION

1. Field of the Invention

The present invention relates to a so-called projector-type vehicular headlamp, and, in particular, to a vehicular headlamp including a liquid crystal shutter.

2. Related Art

In projector-type vehicular headlamps, in general, a projection lens is disposed on an optical axis extending in a vehicular longitudinal direction, a light source is disposed rearwardly of a rear-side focal point of the projection lens, and a reflector reflects light from the light source toward the projection lens. In order for a projector-type vehicular headlamp to form a low-beam distribution pattern, a shade that blocks a part of reflected light from the reflector is disposed in the proximity of the rear-side focal point of the projection lens with the upper end edge of the shade positioned in the proximity of the optical axis, so as to form a cut-off line at the upper end edge of the low-beam distribution pattern.

"Patent Document 1" describes a vehicular headlamp in which the above shade is movable to selectively form a low-beam distribution pattern and a high-beam distribution pattern.

Meanwhile, "Patent Document 2" and "Patent Document 3" describe a vehicular headlamp in which a liquid crystal shutter is disposed in place of the above shade in the proximity of the rear-side focal point of a projection lens. In the vehicular headlamp described in each of "Patent Document 2" and "Patent Document 3," a part of an area of the liquid crystal shutter can be driven to selectively form a low-beam distribution pattern and a high-beam distribution pattern.

[Patent Document 1] Japanese Patent Application Laid-Open (Kokai) No. JP-A-2007-80521

[Patent Document 2] Japanese Patent Application Laid-Open (Kokai) No. JP-A-H1-244934

[Patent Document 3] Japanese Patent Application Laid-Open (Kokai) No. JP-A-H7-296605

SUMMARY OF INVENTION

In the case where a liquid crystal shutter is used to switch between the light distribution patterns as in the vehicular headlamps described in "Patent Document 2" and "Patent Document 3," the lamp configuration can be simplified compared to the case where a movable shade is used as in the vehicular headlamp described in "Patent Document 1."

However, the vehicular headlamps described in "Patent Document 2" and "Patent Document 3" suffer from the following problem.

That is, in the liquid crystal shutter described in each of "Patent Document 2" and "Patent Document 3," a liquid crystal member is disposed generally over the entire area between a pair of transparent plates, and correspondingly a pair of polarization plates are disposed generally over the entire outer surface of the pair of transparent plates. Therefore, of reflected light from the reflector having reached the liquid crystal shutter, not only light having reached an area in a light shielding mode, but also, light having reached an area in a light shielding cancellation mode passes through the pair of polarization plates. When the reflected light from the reflector passes through the polarization plates, the intensity of the light is reduced accordingly. Thus, the low-beam distribution pattern to be formed by the light having passed through the area in the light shielding cancellation mode is darkened accordingly.

In contrast, in the vehicular headlamp according to the related art, a liquid crystal shutter may be disposed only in an area that should be in the light shielding mode. With this configuration, it is possible to prevent the low-beam distribution pattern from being darkened.

However, such a configuration suffers from the following problem.

That is, when the vehicle is running with low-beam light in rainy weather, light emitted from the projection lens and having reached the road surface ahead of the vehicle is regularly reflected by the road surface ahead of the vehicle toward a space above the cut-off line of the low-beam distribution pattern, which results in glare for oncoming drivers.

In order to prevent this phenomenon, an additional liquid crystal shutter may be provided to block light emitted from the projection lens and reflected by the reflector toward the road surface ahead of the vehicle. However, it is necessary that the additional liquid crystal shutter should be disposed like an island (that is, as if floating in the air) above the liquid crystal shutter disposed to form the low-beam distribution pattern, which makes it extremely difficult to dispose the additional liquid crystal shutter at an accurate position. Therefore, it is difficult to effectively prevent glare for oncoming drivers during running in rainy weather.

One or more embodiments of the present invention provide a projector-type vehicular headlamp including a liquid crystal shutter that can effectively prevent glare for oncoming drivers during running in rainy weather while securing sufficient brightness of a low-beam distribution pattern.

One or more embodiments of the present invention devise the construction of a liquid crystal shutter.

That is, one or more embodiments the present invention comprises:

a vehicular headlamp including a projection lens disposed on an optical axis extending in a vehicular longitudinal direction, a light source disposed rearwardly of a rear-side focal point of the projection lens, a reflector disposed rearwardly of the rear-side focal point of the projection lens to reflect light from the light source toward the projection lens, and a liquid crystal shutter disposed in the proximity of the rear-side focal point of the projection lens, wherein the liquid crystal shutter comprises a pair of transparent plates disposed at a predetermined interval in a direction of the optical axis, a liquid crystal member disposed between the pair of transparent plates, and a pair of polarization plates disposed on an outer surface of the pair of transparent plates, wherein the liquid crystal member is disposed only in a part of an area between the pair of transparent plates, and the pair of polarization plates are disposed only in an area of the outer surface of the pair of transparent plates corresponding to an area in which the liquid crystal member is disposed, and wherein the area in which the liquid crystal member is disposed comprises a first area for blocking a part of reflected light from the reflector such that light emitted from the projection lens forms a low-beam distribution pattern having a cut-off line at an upper end edge, and a second area for blocking light emitted from the projection lens and then reflected by a road surface ahead of a vehicle toward a space above the cut-off line.

The type of the "light source" is not specifically limited. For example, a light-emitting portion of a discharge bulb, a filament of a halogen bulb, or a light-emitting chip of a light-emitting diode may be used.

The specific shape of the "cut-off line" is not specifically limited. For example, a combination of a horizontal cut-off line extending in the horizontal direction and an oblique cut-off line extending obliquely upward from the horizontal cut-off line or a pair of left and right horizontal cut-off lines formed to be laterally asymmetrical in a stepped configuration may be used.

The expression "an area of the outer surface of the pair of transparent plates corresponding to an area in which the liquid crystal member is disposed" means an area generally overlapping the area in which the liquid crystal member is disposed as viewed from the front of the lamp.

The specific position at which the "second area" is formed and the size and the shape of the "second area" are not specifically limited.

As described in relation to the above configuration, the vehicular headlamp according to one or more embodiments of the present invention is formed as a projector-type vehicular headlamp including a liquid crystal shutter. In the liquid crystal shutter, the liquid crystal member is disposed only in a part of the area between the pair of transparent plates, and the pair of polarization plates are disposed only in an area of the outer surface of the pair of transparent plates corresponding to the area in which the liquid crystal member is disposed. The area in which the liquid crystal member is disposed includes the first area for blocking a part of reflected light from the reflector such that light emitted from the projection lens forms the low-beam distribution pattern having the cut-off line at the upper end edge, and the second area for blocking light emitted from the projection lens and then reflected by the road surface ahead of the vehicle to be directed toward a space above the cut-off line. Thus, the following effect can be obtained.

That is, the low-beam distribution pattern can be formed by bringing the first area into a light shielding mode. Meanwhile, a high-beam distribution pattern can be formed by bringing the first area into a light shielding cancellation mode.

By bringing the second area into the light shielding mode during low-beam light operation, light emitted from the projection lens and then reflected by the road surface ahead of the vehicle toward a space above the cut-off line of the low-beam distribution pattern can be reduced during running in rainy weather. This effectively prevents glare for oncoming drivers.

The liquid crystal member and the pair of polarization plates are not disposed in an area of the liquid crystal shutter other than the first and second areas, and, thus, reflected light from the reflector only passes through the pair of transparent plates in that area. Therefore, the intensity of the reflected light from the reflector is hardly reduced in that area, which allows the low-beam distribution pattern to be sufficiently bright.

Such effects can be obtained by disposing the single liquid crystal shutter in which the positional relationship between the first and second areas is fixed. Thus, the second area can be disposed at an accurate position compared to a case where a liquid crystal shutter is disposed only in an area that should be in the light shielding mode during low-beam operation and a liquid crystal shutter for running in rainy weather is disposed like an island above the liquid crystal shutter for low-beam operation as in the related art. This effectively prevents glare for oncoming drivers during running in rainy weather.

According to one or more embodiments of the present invention as described above, in a projector-type vehicular headlamp including a liquid crystal shutter, it is possible to effectively prevent glare for oncoming drivers during running in rainy weather while securing sufficient brightness of a low-beam distribution pattern.

In one or more embodiments of the present invention, in addition, the above effects can be obtained by disposing the single liquid crystal shutter. Thus, the effect of simplifying the lamp configuration through the use of the liquid crystal shutter can be further enhanced.

In the above configuration, the liquid crystal member disposed in the second area may have an outer shape that is slightly larger than an outer shape of the pair of polarization plates disposed in correspondence with the second area. With this configuration, the following effect can be obtained.

That is, by bringing the second area into the light shielding mode during low-beam light operation, a dark portion in a shape corresponding to the shape of the second area is formed at a position corresponding to the position of the second area on the road surface ahead of the vehicle. The intensity of light having passed through the outer periphery portion of the liquid crystal member disposed in the second area, which extends off the outer shape of the pair of polarization plates, is somewhat lower than the intensity of light not having passed through the liquid crystal member. Thus, a portion of the road surface ahead of the vehicle that is irradiated with the light having passed through the outer periphery portion is somewhat darker than the surrounding portion. Thus, it is possible to blur the contours of the dark portion formed on the road surface ahead of the vehicle when the second area is brought into the light shielding mode. This reduces the possibility that the driver of the vehicle feels uncomfortable with a distinct dark portion formed on the road surface ahead of the vehicle.

In the above configuration, the pair of polarization plates disposed in correspondence with the second area may be configured to have an outer shape of a generally inverted trapezoid. With this configuration, an image to be formed on a virtual vertical screen ahead of the vehicle as an inverted projection image has a generally trapezoidal outer shape, and the inverted projection image is formed as an image that generally matches the shape of a road with a certain width on the road surface ahead of the vehicle. Therefore, it is possible to effectively reduce light reflected by the road surface ahead of the vehicle to be directed toward a space above the cut-off line of the low-beam distribution pattern while reducing the area occupied by the pair of polarization plates disposed in correspondence with the second area to the necessary minimum.

In the above configuration, the light source may be disposed on an axis line intersecting the optical axis, and the reflector may include a first reflector that reflects light from the light source toward the optical axis, and a second reflector that reflects reflected light from the first reflector forward. With this configuration, the length of the lamp in the front-back direction can be shortened.

A vehicular headlamp including a movable shade according to the related art requires a space for disposing an actuator or the like that drives the shade. Thus, the length of the lamp in the front-back direction cannot be shortened very much even if the light source and the first and second reflectors are disposed as described above. However, a vehicular headlamp including a liquid crystal shutter does not require a space for disposing an actuator or the like. Thus, the length of the lamp in the front-back direction can be shortened sufficiently.

In this case, the light source may be disposed below the optical axis, and the second reflector may be formed by a heat-ray transparent mirror. With this configuration, it is possible to effectively prevent the liquid crystal shutter from being heated by reflected light from the second reflector.

Other aspects and advantages of the invention will be apparent from the following description, the drawings and the claims.

DETAILED DESCRIPTION

Hereinafter, embodiments of the present invention will be described with reference to accompanying drawings.

Figure 1:
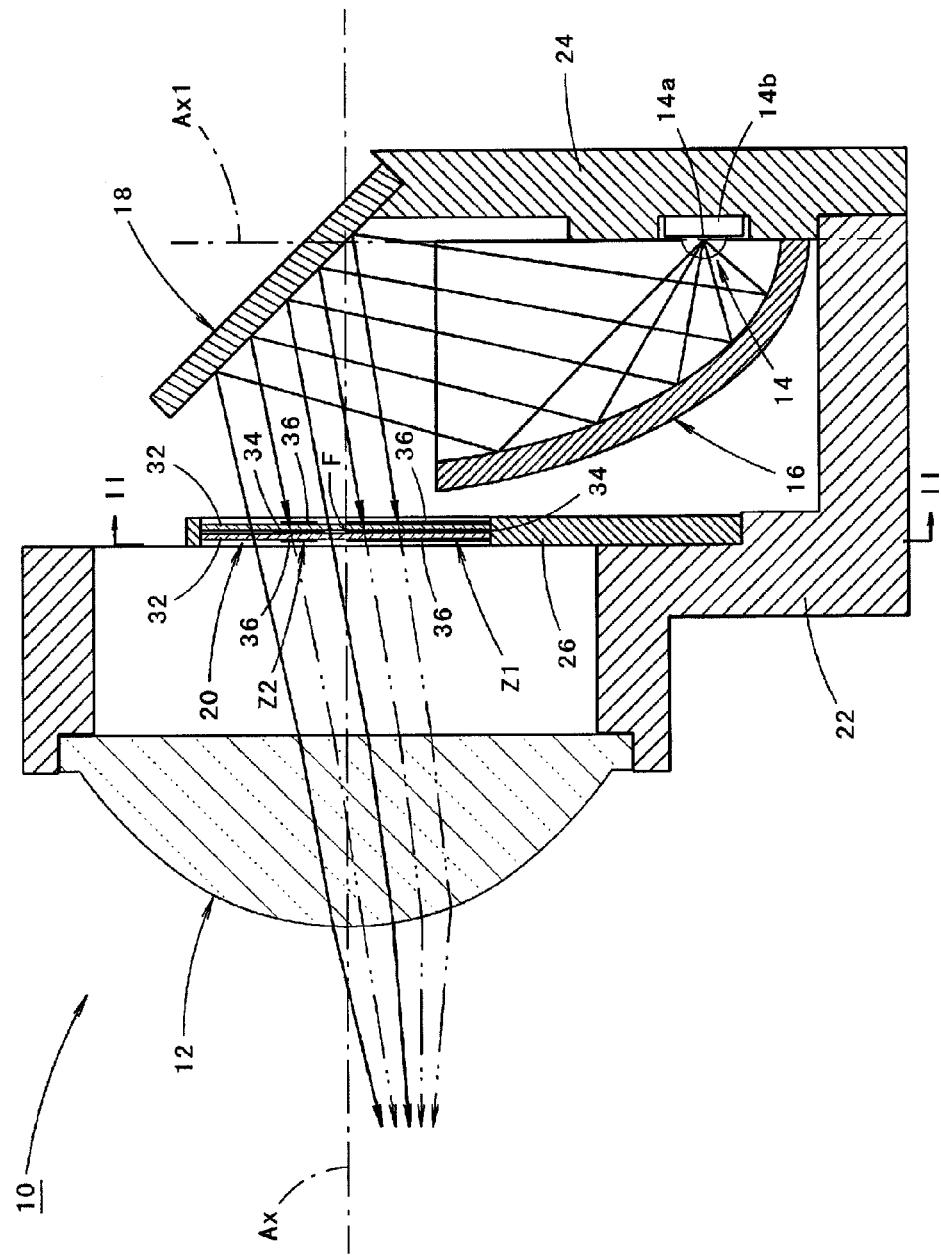
FIG. 1 is a side cross-sectional view showing a vehicular headlamp according to an embodiment of the present invention.
Figure 2:
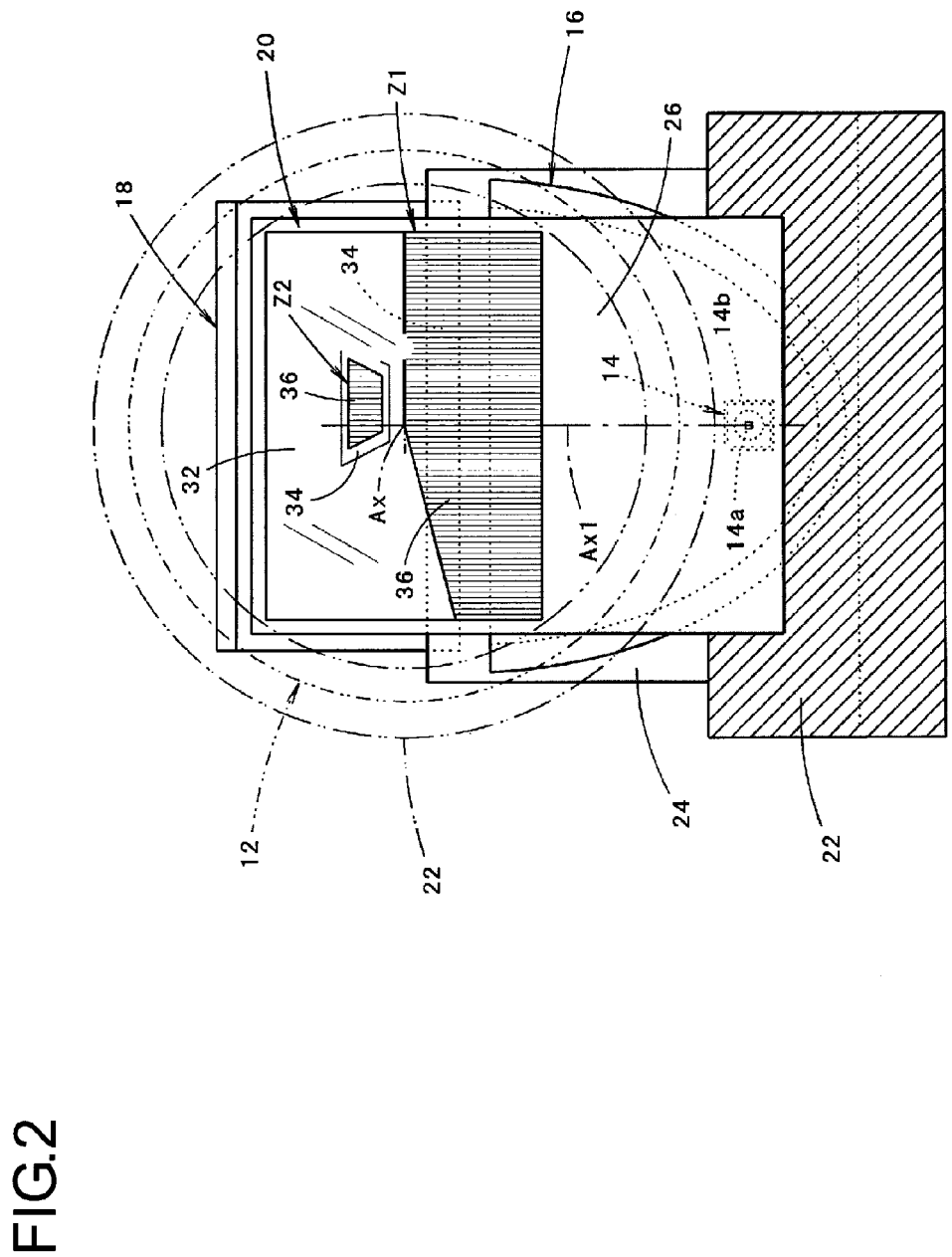
FIG. 2 is a II-II cross-sectional view of FIG. 1.

FIG. 1 is a side cross-sectional view showing a vehicular headlamp according to an embodiment of the present invention. FIG. 2 is a II-II cross-sectional view of FIG. 1.

As shown in the drawings, a vehicular headlamp 10 according to an embodiment is formed as a projector-type lamp unit, and is used as it is assembled in a lamp body (not shown) or the like as a part of a headlamp.

The vehicular headlamp 10 includes a projection lens 12 disposed on an optical axis Ax extending in a vehicular longitudinal direction, a light source 14a disposed rearwardly of a rear-side focal point F of the projection lens 12, first and second reflectors 16, 18 serving as a reflector disposed rearwardly of the rear-side focal point F to reflect light from the light source 14a toward the projection lens 12, a liquid crystal shutter 20 disposed in the proximity of the rear-side focal point F, and holders 22, 24, 26 that support these components.

When the vehicular headlamp 10 is assembled as a part of a headlamp, the vehicular headlamp 10 is disposed such that the optical axis Ax extends downward by about 0.5° to 0.6° with respect to the vehicular longitudinal direction.

The projection lens 12 is a planoconvex aspherical lens with a convex front surface and a flat rear surface, and is supported at its peripheral edge portion by the holder 22. The projection lens 12 projects a light source image formed on the rear-side focal plane of the projection lens 12 (that is, a focal plane of the projection lens 12 including the rear-side focal point F) onto a virtual vertical screen ahead of the lamp as an inverted image.

The light source 14a is a light-emitting chip of a white light-emitting diode 14, has a rectangular light emitting surface, and is supported by a substrate 14b. The white light-emitting diode 14 is supported by the holder 24 at a location below the optical axis Ax. The white light-emitting diode 14 is disposed such that the light emitting surface of the light source 14a is located on an axis line Ax1 extending generally in the vertical direction to intersect the optical axis Ax and is directed forward.

The first reflector 16 has a generally semi-dome shape to cover the light source 14a from the front side, and is supported at its rear end edge by the holder 24. The first reflector 16 reflects light from the light source 14a upward as convergent light. The reflective surface of the first reflector 16 is formed by a curved surface that provides light from the light source 14a with a smaller degree of convergence in a direction along a vertical plane orthogonal to the optical axis Ax than in a direction along a vertical plane including the optical axis Ax.

The second reflector 18 is formed by a heat-ray transparent mirror disposed inclined obliquely forward and upward in the proximity of the intersection of the optical axis Ax and the axis line Ax1. The second reflector 18 is supported at its lower end by the holder 24. The second reflector 18 regularly reflects light from the light source 14a reflected by the first reflector 16 forward.

The liquid crystal shutter 20 is disposed at the rear-side focal point F of the projection lens 12 and along a vertical plane orthogonal to the optical axis Ax.

Figure 3:
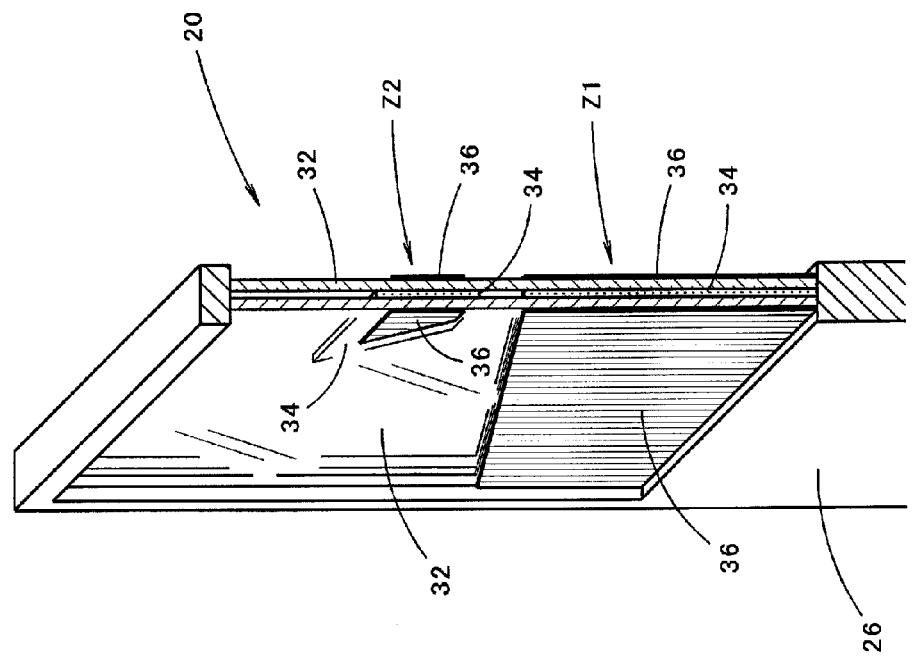
FIG. 3 is a cross-sectional perspective view showing a liquid crystal shutter of the vehicular headlamp.

FIG. 3 is a cross-sectional perspective view showing the liquid crystal shutter 20 as a single component.

As shown in the drawing, the liquid crystal shutter 20 includes a pair of transparent plates 32, a liquid crystal member 34, and a pair of polarization plates 36. The pair of transparent plates 32 are disposed at a predetermined interval in the front-back direction. The liquid crystal member 34 is disposed between the pair of transparent plates 32. The pair of polarization plates 36 are disposed on an outer surface of the pair of transparent plates 32 (that is, on the front surface of the transparent plate 32 on the front side and on the rear surface of the transparent plate 32 on the rear side). The liquid crystal shutter 20 is supported at its periphery by the holder 26.

The pair of transparent plates 32 are each formed by a glass plate. A transparent electrode and an oriented film (not shown) are formed on an inner surface of each of the transparent plates 32. The pair of transparent plates 32 are formed to have a shape of a horizontally long rectangle centered on the optical axis Ax. Reflected light from the second reflector 18 is all incident on the transparent plates 32.

The liquid crystal member 34 is configured such that liquid crystal is sealed in an area surrounded by a spacer with a thin frame. The liquid crystal member 34 is disposed only in a part of an area between the pair of transparent plates 32. The area in which the liquid crystal member 34 is disposed includes a first area Z1 for low-beam light and a second area Z2 for running in rainy weather.

The first area Z1 is positioned below the optical axis Ax, and occupies nearly half the area of the transparent plates 32. The upper end edge of the first area Z1 extends horizontally to the left (in FIG. 2, to the right) from the optical axis Ax, and extends straight obliquely downward to the right from the optical axis Ax.

The second area Z2 is positioned above the optical axis Ax. The second area Z2 is configured as a relatively small area having an outer shape of a generally inverted trapezoid (specifically, of an isosceles trapezoid inverted vertically). The second area Z2 is disposed to extend across a vertical plane including the optical axis Ax in the left-right direction, with the center of the second area Z2 in the left-right direction slightly displaced to the left with respect to the optical axis Ax. Thus, the lower end edge of the second area Z2 is disposed at a predetermined distance above the horizontal portion of the upper end edge of the first area Z1.

The pair of polarization plates 36 are disposed only in an area of the outer surface of the pair of transparent plates 32 corresponding to the area in which the liquid crystal member 34 is disposed. Each polarization plate 36 disposed in correspondence with the first area Z1 has generally the same outer shape as the outer shape of the first area Z1. Meanwhile, each polarization plate 36 disposed in correspondence with the second area Z2 has an outer shape that is slightly smaller than the outer shape the second area Z2.

The first area Z1 of the liquid crystal shutter 20 is brought into a light shielding mode to block reflected light from the second reflector 18 (in FIG. 1, blocked light paths are indicated by two-dotted broken lines) during low-beam operation. Meanwhile, during high-beam operation, the first area Z1 is brought into a light shielding cancellation mode to allow passage of reflected light from the second reflector 18.

The second area Z2 of the liquid crystal shutter 20 is brought into a light shielding cancellation mode to allow passage of reflected light from the second reflector 18 during running with high-beam light and during running in normal condition with low-beam light. Meanwhile, during running in rainy weather with low-beam light, the second area Z2 is brought into a light shielding mode to block reflected light from the second reflector 18 (in FIG. 1, blocked light paths are indicated by two-dotted broken lines). The determination between running in normal condition and running in rainy weather may be performed automatically by a raindrop sensor or the like, or by a driver on the basis of his/her perception.

Both the holders 24, 26 are supported at their lower end by the holder 22.

Figure 4:
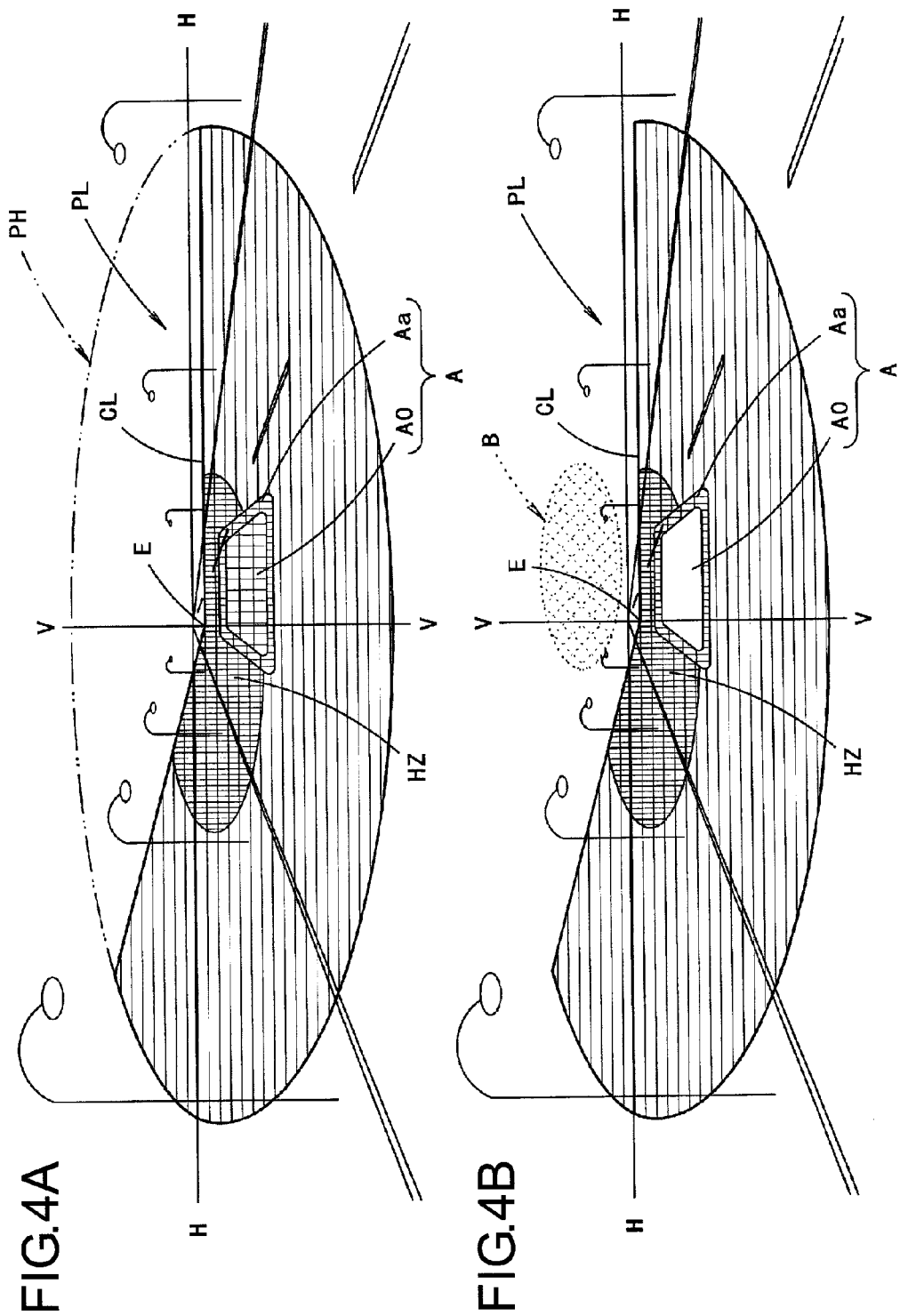
FIG. 4 perspectively shows a light distribution pattern to be formed on a virtual vertical screen disposed at a distance of 25 m ahead of the lamp by radiated light from the vehicular headlamp.

FIG. 4 perspectively shows a low-beam distribution pattern PL to be formed on a virtual vertical screen disposed at a distance of 25 meters (m) ahead of the vehicle by light emitted forward from the vehicular headlamp 10 according to the embodiment shown in FIGS. 1-3.

FIG. 4(a) shows the low-beam distribution pattern PL formed during running in normal condition. FIG. 4(b) shows the low-beam distribution pattern PL formed during running in rainy weather. In FIG. 4(a), the light distribution pattern, the outer shape of which is indicated by a two-dotted broken line, is a high-beam distribution pattern PH.

The low-beam distribution pattern PL is a low-beam distribution pattern for left side light distribution, and has a cut-off line CL at an upper end edge.

The cut-off line CL is formed to extend in the horizontal direction on the right side (that is, on the side of the oncoming lane) of a V-V line, which is a vertical line passing through a point H-V as the vanishing point in the forward direction of the lamp, and to extend straight obliquely upward to the left on the left side (that is, on the side of the lane in which the vehicle is located) of the V-V line.

In the low-beam distribution pattern PL, an elbow point E, which is the intersection of the cut-off line CL and the V-V line, is positioned about 0.5° to 0.6° below the point H-V. This is because the optical axis Ax extends downward by about 0.5° to 0.6° with respect to the vehicular longitudinal direction. In the low-beam distribution pattern PL, a hot zone HZ, which is an area of high-intensity light, is formed to surround a slightly left side of the elbow point E.

The low-beam distribution pattern PL is formed by having an image of the light source 14a, which is formed by light from the light source 14a sequentially reflected by the first and second reflectors 16, 18 on the rear-side focal plane of the projection lens 12, inversely projected onto the virtual vertical screen by the projection lens 12. The cut-off line CL of the low-beam distribution pattern PL is formed as an inverted projection image of the upper end edge of the first area Z1 of the liquid crystal shutter 20, which is in the light shielding mode. Because the upper end edges of the liquid crystal member 34 and each polarization plate 36 positioned in the first area Z1 are aligned with each other, the cut-off line CL is formed distinctly.

As shown in FIG. 4(a), in the low-beam distribution pattern PL formed during running in normal condition, a generally trapezoidal area A positioned at the lower right of the elbow point E is somewhat darker than the surrounding area. This is because although the second area Z2 of the liquid crystal shutter 20 is in the light shielding cancellation mode, the liquid crystal member 34 and the pair of polarization plates 36 are disposed in the second area Z2.

In the area A, an outer periphery portion Aa is brighter than a center portion A0 inside the outer periphery portion Aa. This is because the outer periphery portion Aa is formed by light that has passed through only the liquid crystal member 34 while the center portion A0 is formed by light that has passed through the liquid crystal member 34 and the pair of polarization plates 36, in addition to the pair of transparent plates 32.

An area in the low-beam distribution pattern PL other than the area A is formed by light that has passed through only the pair of transparent plates 32, and, thus, even in the presence of the liquid crystal shutter 20, the brightness of the area is hardly diminished by the liquid crystal shutter 20.

As shown in FIG. 4(b), in the low-beam distribution pattern PL formed during running in rainy weather, the center portion A0 of the area A is a dark portion. This is because the second area Z2 of the liquid crystal shutter 20 is in the light shielding mode. However, the outer periphery portion Aa of the area A is brighter than the center portion A0, although it is somewhat darker than the surrounding area, because the outer periphery portion Aa of the area A allows passage of light even when the second area Z2 is in the light shielding mode.

In FIG. 4(b), an area B indicated by the broken line on the virtual vertical screen is an area irradiated with radiated light from the vehicular headlamp 10 regularly reflected in an area in the proximity of the area A on the road surface ahead of the vehicle. The area B is positioned in a space closely above the cut-off line CL of the low-beam distribution pattern PL.

In the low-beam distribution pattern PL formed during running in rainy weather, the center portion A0 of the area A is a dark portion. Thus, the amount of light regularly reflected by the road surface ahead of the vehicle, which is wet with rain, toward the area B is significantly reduced compared to the case where the low-beam distribution pattern PL is formed during running in normal condition.

The high-beam distribution pattern PH shown in FIG. 4(a) is formed by bringing the first area Z1 of the liquid crystal shutter 20 into the light shielding cancellation mode.

As discussed in detail above, the vehicular headlamp 10 according to one or more embodiments is formed as a projector-type vehicular headlamp including the liquid crystal shutter 20. In the liquid crystal shutter 20, the liquid crystal member 34 is disposed only in a part of the area between the pair of transparent plates 32, and the pair of polarization plates 36 are disposed only in an area of the outer surface of the pair of transparent plates 32 corresponding to the area in which the liquid crystal member 34 is disposed. The area in which the liquid crystal member 34 is disposed includes the first area Z1 for blocking a part of reflected light from the first and second reflectors 16, 18 such that light emitted from the projection lens 12 forms the low-beam distribution pattern PL having the cut-off line CL at the upper end edge, and the second area Z2 for blocking light emitted from the projection lens 12 and then reflected by the road surface ahead of the vehicle toward a space above the cut-off line CL. Thus, the following effect can be obtained.

That is, the low-beam distribution pattern PL can be formed by bringing the first area Z1 into the light shielding mode. Meanwhile, the high-beam distribution pattern PH can be formed by bringing the first area Z1 into a light shielding cancellation mode.

By bringing the second area Z2 into the light shielding mode during low-beam light operation, light emitted from the projection lens 12 and then reflected by the road surface ahead of the vehicle to be directed toward a space above the cut-off line CL of the low-beam distribution pattern PL can be reduced even during running in rainy weather. This effectively prevents glare for oncoming drivers.

The liquid crystal member 34 and the pair of polarization plates 36 are not disposed in an area of the liquid crystal shutter 20 other than the first and second areas Z1, Z2, and, thus, reflected light from the first and second reflectors 16, 18 only passes through the pair of transparent plates 32 in that area. Therefore, the intensity of the reflected light from the first and second reflectors 16, 18 is hardly reduced in that area, which allows the low-beam distribution pattern PL to be sufficiently bright.

In addition, such effects can be obtained by disposing the single liquid crystal shutter 20 in which the positional relationship between the first and second areas Z1, Z2 is fixed. Thus, the second area Z2 can be disposed at an accurate position compared to a case where a liquid crystal shutter is disposed only in an area that should be in the light shielding mode during low-beam operation and a liquid crystal shutter for running in rainy weather is disposed like an island above the liquid crystal shutter for low-beam operation as in the related art. This effectively prevents glare for oncoming drivers during running in rainy weather.

According to the embodiments described above, in the projector-type vehicular headlamp 10 including the liquid crystal shutter 20, it is possible to effectively prevent glare for oncoming drivers during running in rainy weather while securing sufficient brightness of the low-beam distribution pattern PL.

In one or more embodiments, in addition, the above effects can be obtained by disposing the single liquid crystal shutter 20. Thus, the effect of simplifying the lamp configuration through the use of the liquid crystal shutter 20 can be further enhanced.

In one or more embodiments, the liquid crystal member 34 disposed in the second area Z2 has an outer shape that is slightly larger than an outer shape of the pair of polarization plates 36 disposed in correspondence with the second area Z2. Thus, the following effect can be obtained.

That is, by bringing the second area Z2 into the light shielding mode during low-beam light operation, the area A in a shape corresponding to the shape of the second area Z2 is formed as a dark portion at a position corresponding to the position of the second area Z2 on the road surface ahead of the vehicle. The intensity of light having passed through the outer periphery portion of the liquid crystal member 34 disposed in the second area Z2, which extends off the outer shape of the pair of polarization plates 36, is somewhat lower than the intensity of light not having passed through the liquid crystal member 34. Thus, a portion of the road surface ahead of the vehicle that is irradiated with the light having passed through the outer periphery portion (that is, the outer periphery portion Aa of the area A) is somewhat darker than the surrounding portion. Therefore, it is possible to blur the contours of the dark portion formed on the road surface ahead of the vehicle (that is, the center portion A0 of the area A) when the second area Z2 is brought into the light shielding mode. This reduces the possibility that the driver of the vehicle feels uncomfortable with a distinct dark portion formed on the road surface ahead of the vehicle.

In one or more embodiments, in addition, the pair of polarization plates 36 disposed in correspondence with the second area Z2 are configured to have an outer shape of a generally inverted trapezoid. Thus, an image to be formed on a virtual vertical screen ahead of the vehicle as an inverted projection image has a generally trapezoidal outer shape, and the inverted projection image is formed as an image that generally matches the shape of a road with a certain width on the road surface ahead of the vehicle. Therefore, it is possible to effectively reduce light reflected by the road surface ahead of the vehicle to be directed toward a space above the cut-off line CL of the low-beam distribution pattern PL while reducing the area occupied by the pair of polarization plates 36 disposed in correspondence with the second area Z2 to the necessary minimum.

In the vehicular headlamp 10 according to one or more embodiments, further, the light source 14a is disposed on the axis line Ax1 intersecting the optical axis Ax, light from the light source 14a is reflected toward the optical axis Ax by the first reflector 16, and reflected light from the first reflector 16 is reflected forward by the second reflector 18. Thus, the length of the lamp in the front-back direction can be shortened.

A vehicular headlamp including a movable shade according to the related art requires a space for disposing an actuator or the like that drives the shade. Thus, the length of the lamp in the front-back direction cannot be shortened very much even if the light source 14a and the first and second reflectors 16, 18 are disposed as described above. However, the vehicular headlamp 10 according to one or more embodiments including the liquid crystal shutter 20 does not require a space for disposing an actuator or the like. Thus, the length of the lamp in the front-back direction can be shortened sufficiently.

In the vehicular headlamp 10 according to one or more embodiments, in addition, the light source 14a is disposed below the optical axis Ax, and the second reflector 18 is formed by a heat-ray transparent mirror. Thus, it is possible to effectively prevent the liquid crystal shutter 20 from being heated by reflected light from the second reflector 18. In the vehicular headlamp according to one or more embodiments, the light source 14a is formed as a light-emitting chip of the white light-emitting diode 14, and, thus, light reaching the second reflector 18 does not contain a large amount of heat rays. In the case where the light source 14a is formed by a filament of a halogen bulb or the like, it is particularly effective to form the second reflector 18 by a heat-ray transparent mirror.

Now, a modification of the above embodiments will be described.

Figure 5:
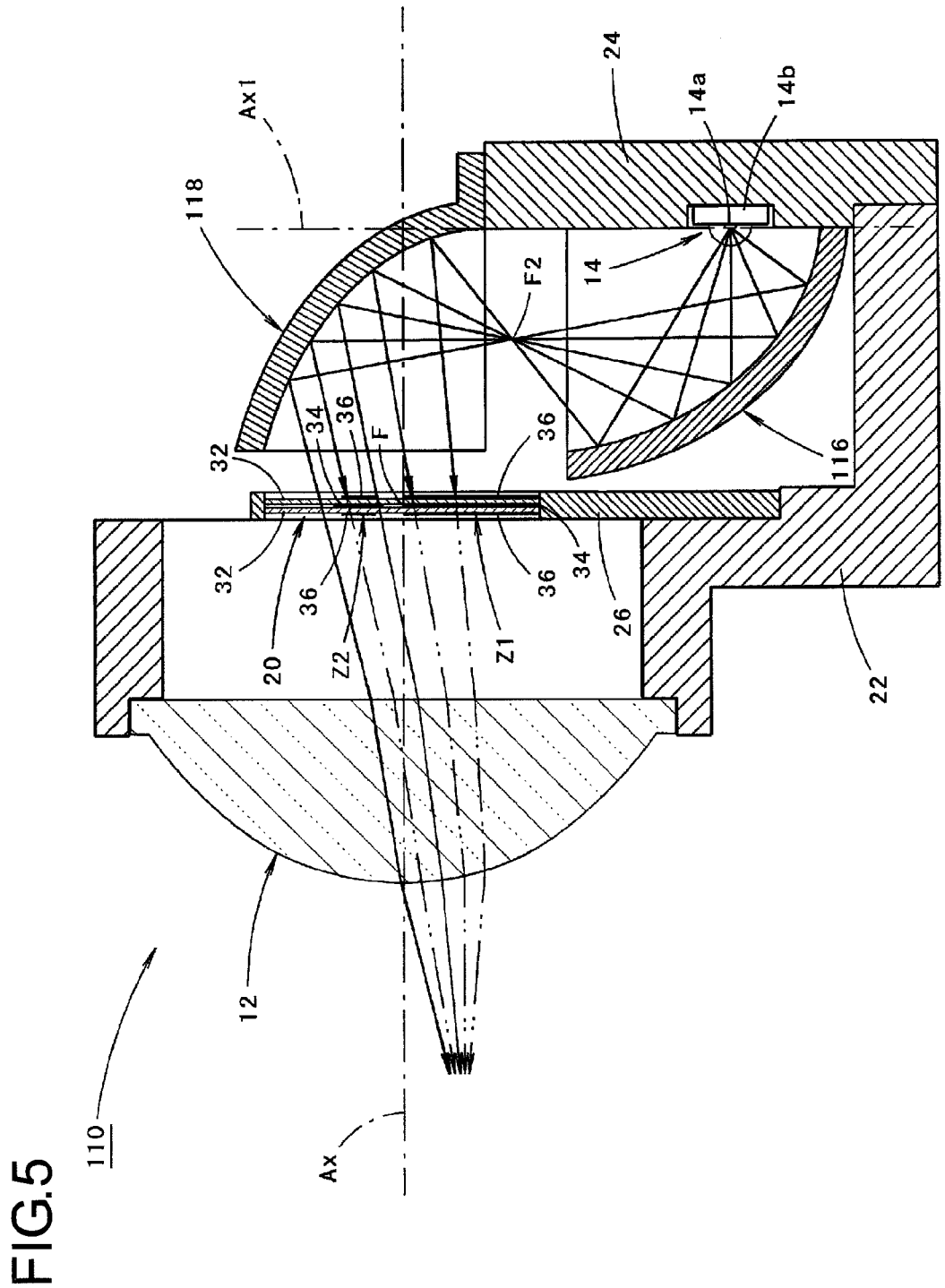
FIG. 5 is a view similar to FIG. 1 showing a modification of the embodiment.

FIG. 5 is a view similar to FIG. 1 showing a vehicular headlamp 110 according to a modification.

As shown in FIG. 5, the configuration of the vehicular headlamp according to the modification is basically the same as the configuration of the vehicular headlamp according to the embodiments described above. However, the configuration of first and second reflectors 116, 118 is different from the configuration of the counterparts according to the embodiments described above.

That is, as with the first reflector 16 according to the embodiments described above, the first reflector 116 according to the modification has a generally semi-dome shape to cover the light source 14a from the front side, and is supported at its rear end edge by the holder 24. The first reflector 116 reflects light from the light source 14a upward as convergent light. The reflective surface of the first reflector 116 is formed by a rotational ellipsoid with a point on the light source 14a serving as a first focal point and a point positioned obliquely above and forwardly of the first focal point and below the optical axis Ax serving as a second focal point F2.

The second reflector 118 according to the modification is disposed in the proximity of the optical axis Ax and at a position above the first reflector 116, and is supported at its rear end edge by the holder 24. The second reflector 118 reflects light from the light source 14a reflected by the first reflector 116 and converged on the second focal point F2 forward as convergent light. The reflective surface of the second reflector 118 is formed by a curved surface that provides reflected light from the first reflector 116 with a smaller degree of convergence in a direction along a horizontal plane including the optical axis Ax than in a direction along a vertical plane including the optical axis Ax.

Also, in the case where the configuration according to the modification is adopted, generally the same effect as those obtained by the configuration according to the embodiments described above can be obtained.

The numerical values provided as specifications in the embodiments and the modification are merely exemplary, and those skilled in the art will appreciate that different values may be used appropriately.

While a low-beam distribution pattern PL for left side light distribution is formed in the embodiments and the modification, a low-beam distribution pattern PL for right side light distribution may also be formed using the same configuration as those according to the embodiments and the modification to achieve the same effect as those obtained in the embodiments and the modification.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

[Description of the Reference Numerals]
10, 110 VEHICULAR HEADLAMP
12 PROJECTION LENS
14 WHITE LIGHT-EMITTING DIODE
14a LIGHT SOURCE
14b SUBSTRATE
16, 116 FIRST REFLECTOR
18, 118 SECOND REFLECTOR
20 LIQUID CRYSTAL SHUTTER
22, 24, 26 HOLDER
32 TRANSPARENT PLATE
34 LIQUID CRYSTAL MEMBER
36 POLARIZATION PLATE
A, B AREA
A0 CENTER PORTION
Aa OUTER PERIPHERY PORTION
Ax OPTICAL AXIS
Ax1 AXIS LINE
CL CUT-OFF LINE
E ELBOW POINT
F REAR-SIDE FOCAL POINT
F2 SECOND FOCAL POINT
HZ HOT ZONE
PH HIGH-BEAM DISTRIBUTION PATTERN
PL LOW-BEAM DISTRIBUTION PATTERN
Z1 FIRST AREA
Z2 SECOND AREA

What is claimed is:

1. A vehicular headlamp comprising:
a projection lens disposed on an optical axis extending in a vehicular longitudinal, direction,
a light source disposed rearwardly of a rear-side focal point of the projection lens,
a reflector disposed rearwardly of the rear-side focal point of the projection lens to reflect light from the light source toward the projection lens, and
a liquid crystal shutter disposed in the proximity of the rear-side focal point of the projection lens,
wherein the liquid crystal shutter comprises:
a pair of transparent plates disposed at a predetermined interval in a direction of the optical axis,
a liquid crystal member disposed between the pair of transparent plates, and
a pair of polarization plates disposed on an outer surface of the pair of transparent plates,
wherein the liquid crystal member is disposed only in a part of an area between the pair of transparent plates,
wherein the pair of polarization plates are disposed only in an area of the outer surface of the pair of transparent plates corresponding to an area in which the liquid crystal member is disposed, and
wherein the area in which the liquid crystal member is disposed comprises:
a first area for blocking a part of reflected light from the reflector such that light emitted from the projection lens forms a low-beam distribution pattern having a cut-off line at an upper end edge, and
a second area for blocking light emitted from the projection lens and then reflected by a road surface ahead of a vehicle toward a space above the cut-off line.

2. The vehicular headlamp according to claim 1, wherein the liquid crystal member disposed in the second area has an outer shape that is slightly larger than an outer shape of the pair of polarization plates disposed in correspondence with the second area.

3. The vehicular headlamp according to claim 1, wherein the pair of polarization plates disposed in correspondence with the second area are configured to have an outer shape of a generally inverted trapezoid.

4. The vehicular headlamp according to claim 1,
wherein the light source is disposed on an axis line intersecting the optical axis, and
wherein the reflector comprises:
a first reflector that reflects light from the light source toward the optical axis, and
a second reflector that reflects reflected light from the first reflector forward.

5. The vehicular headlamp according to claim 4,
wherein the light source is disposed below the optical axis, and
wherein the second reflector is formed by a heat-ray transparent mirror.

6. The vehicular headlamp according to claim 5, wherein the first reflector has a generally semi-dome shape, and second reflector is inclined obliquely forward and upward in the proximity of the intersection of the optical axis and the axis line intersecting the optical axis.

7. A method of manufacturing a vehicular headlamp comprising:
disposing a projection lens on an optical axis extending in a vehicular longitudinal direction,
disposing a light source rearwardly of a rear-side focal point of the projection lens,
disposing a reflector rearwardly of the rear-side focal point of the projection lens to reflect light from the light source toward the projection lens,
disposing a liquid crystal shutter in the proximity of the rear-side focal point of the projection lens, wherein the liquid crystal shutter comprises:
a pair of transparent plates disposed at a predetermined interval in a direction of the optical axis,
a liquid crystal member disposed between the pair of transparent plates, and
a pair of polarization plates disposed on an outer surface of the pair of transparent plates, disposing the liquid crystal member only in a part of an area between the pair of transparent plates, and disposing the pair of polarization plates only in an area of the outer surface of the pair of transparent plates corresponding to an area in which the liquid crystal member is disposed, wherein the area in which the liquid crystal member is disposed comprises:

a first area for blocking a part of reflected light from the reflector such that light emitted from the projection lens forms a low-beam distribution pattern having a cut-off line at an upper end edge, and a second area for blocking light emitted from the projection lens and then reflected by a road surface ahead of a vehicle toward a space above the cut-off line.

8. The method according to claim 7, wherein the liquid crystal member disposed in the second area has an outer shape that is slightly larger than an outer shape of the pair of polarization plates disposed in correspondence with the second area.

9. The method according to claim 8, wherein the pair of polarization plates disposed in correspondence with the second area are configured to have an outer shape of a generally inverted trapezoid.

10. The method according to claim 9, wherein the light source is disposed on an axis line intersecting the optical axis, and wherein the reflector comprises: a first reflector that reflects light from the light source toward the optical axis, and a second reflector that reflects reflected light from the first reflector forward.

11. The method according to claim 10, wherein the light source is disposed below the optical axis, and wherein the second reflector is formed by a heat-ray transparent mirror.

12. The method according to claim 11, wherein the first reflector has a generally semi-dome shape, and second reflector is inclined obliquely forward and upward in the proximity of the intersection of the optical axis and the axis line intersecting the optical axis.

* * * * *